United States Patent
Wipasuramonton et al.

(10) Patent No.: US 7,431,332 B2
(45) Date of Patent: Oct. 7, 2008

(54) SIDE AIR BAG MODULE

(75) Inventors: Pongdet P. Wipasuramonton, Rochester, MI (US); Jeffery Young, Warren, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 100 days.

(21) Appl. No.: 11/093,474

(22) Filed: Mar. 30, 2005

(65) Prior Publication Data

US 2005/0218635 A1    Oct. 6, 2005

Related U.S. Application Data

(60) Provisional application No. 60/558,297, filed on Mar. 31, 2004, provisional application No. 60/557,719, filed on Mar. 30, 2004.

(51) Int. Cl.
*B60R 21/16* (2006.01)
(52) U.S. Cl. .................... 280/730.2; 280/743.1
(58) Field of Classification Search .............. 280/730.2, 280/743.2, 743.1
See application file for complete search history.

(56) References Cited

U.S. PATENT DOCUMENTS

| | | | | |
|---|---|---|---|---|
| 5,533,750 A | * | 7/1996 | Karlow et al. | 280/730.2 |
| 6,270,113 B1 | * | 8/2001 | Wipasuramonton et al. | 280/730.2 |
| 6,425,601 B1 | * | 7/2002 | Lewis | 280/728.2 |
| 6,827,368 B2 | * | 12/2004 | Jang et al. | 280/729 |
| 7,063,350 B2 | * | 6/2006 | Steimke et al. | 280/729 |
| 7,195,280 B2 | * | 3/2007 | Wheelwright et al. | 280/743.1 |

FOREIGN PATENT DOCUMENTS

EP    1 044 854 A2    10/2000
EP    1 340 656 A2    9/2003

OTHER PUBLICATIONS

Anonymous, "Side air bag system", Research Disclosure, Kenneth Mason Publications, Westbourne, GB, vol. 439, No. 14, Nov. 2000, XP007127055, ISSN 0374-4353.

* cited by examiner

*Primary Examiner*—Eric Culbreth
(74) *Attorney, Agent, or Firm*—Markell Seitzman

(57) ABSTRACT

A side impact or rollover protection restraint system (20) is presented having an air bag (22) which upon inflation is of sufficient height to extend from proximate a seat (25) of a vehicle to a location generally adjacent the shoulder of a 95th percentile sized seated occupant such that the inflated air bag will lie between the occupant and a side portion of the vehicle. The air bag including a first and a second panel (24a,24b) of material that are joined together to create a pair of inflatable volumes (36,38) and an internal tether (30) for forming a corresponding bridge between predetermined regions of each of the first and second panel (24a, 24b) such that upon inflation of the air bag these regions are spaced from one another by at least one internal tether, wherein the air bag includes more than one inflatable volume, wherein each volume includes corresponding internal tethers.

19 Claims, 4 Drawing Sheets

SIDE AIR BAG MODULE

CROSS-REFERENCE TO RELATED APPLICATIONS

This application claims the benefit of U.S. Provisional Application No. 60/558,297, filed on Mar. 31, 2004 and U.S. Provisional Application No. 60/557,719, filed on Mar. 30, 2004. The disclosures of the above applications are incorporated herein by reference.

FIELD OF THE INVENTION

The present invention relates to an inflatable side air bag module assembly designed to provide occupant protection to vehicle passengers during a side impact event. More particularly, the module is mounted proximate the vehicle door and concealed by the vehicle seat.

BACKGROUND AND SUMMARY OF THE INVENTION

Upon lateral impact, an air bag deploys between the occupant and intruding object to protect the outboard front and rear occupants. The present invention defines an air bag having multiple inflatable chambers within the air bag that insures the front and the rear panels of the air bag remain spaced apart to provide added protection for the occupant while keeping the chamber volume at an acceptable level.

In order to control the inflated shape and volume of an air bag it has been proposed to directly sew the front and rear panels of the cushion together. This type of construction defines various chambers in the air bag (in which certain portions of the front and rear panels are spaced apart) but this construction also places other portions of the panels in direct contact, particularly at the separator sew lines, thus reducing spacing which reduces the "cushioned depth" between the occupant and a side of the vehicle. Additionally, inflation gasses often impinge on critical cushion components. This is not the case with the present invention.

Accordingly the invention discloses a side impact protection restraint system having an air bag of sufficient length to extend from a vehicle seat to an occupant's chest. The air bag, upon inflation, is of sufficient height to extend from proximate the seat of the vehicle to a location generally adjacent the shoulder of a $95^{th}$ percentile sized seated occupant such that the inflated air bag will lie between the occupant and a side portion of the vehicle. The air bag includes a first and a second panel of material joined together to create a pair of inflatable volumes and a single internal tether or separator for forming corresponding bridges between predetermined regions of the first and second panels. The internal tether is positioned at an acute angle between 45 and 65 degrees with respect to the seat back angle, so as to position the lower chamber below the occupant's ribs. Upon inflation of the air bag, the internal tether functions to regulate flow of the deployment gasses.

It is an object of the present invention to provide an air bag to protect one or more vehicle occupants in a side impact crash event. The features, functions, and advantages can be achieved independently in various embodiments of the present invention or may be combined in yet other embodiments.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
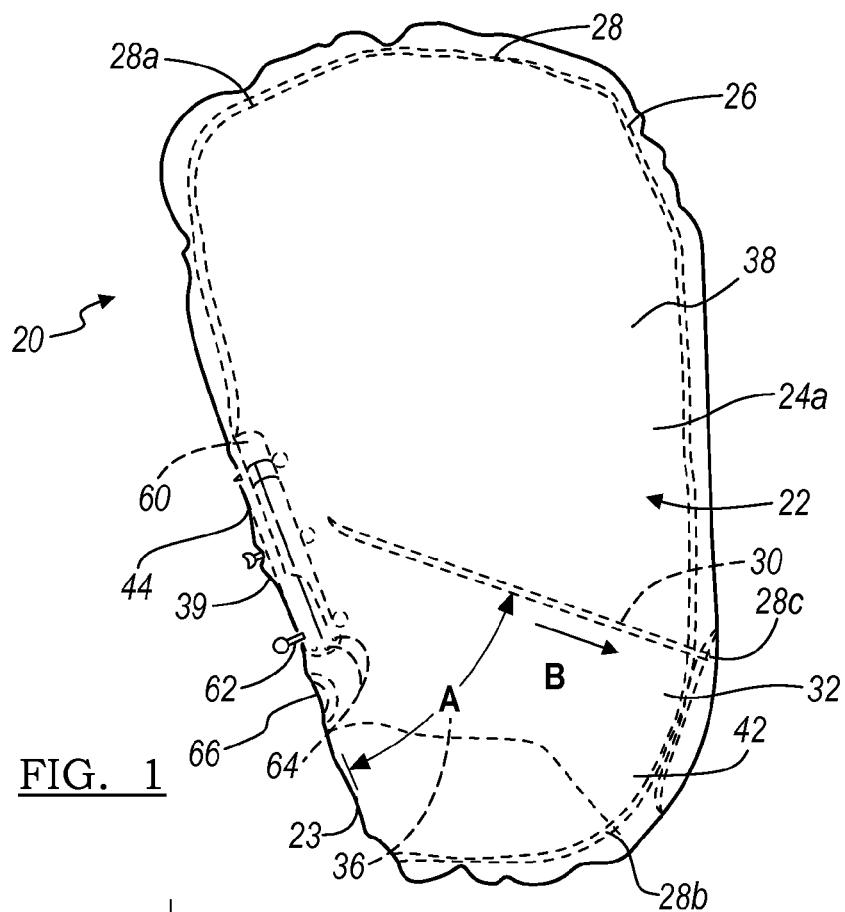
FIG. 1 illustrates a side plan view of an inflated air bag with angled chamber separator.
Figure 3:
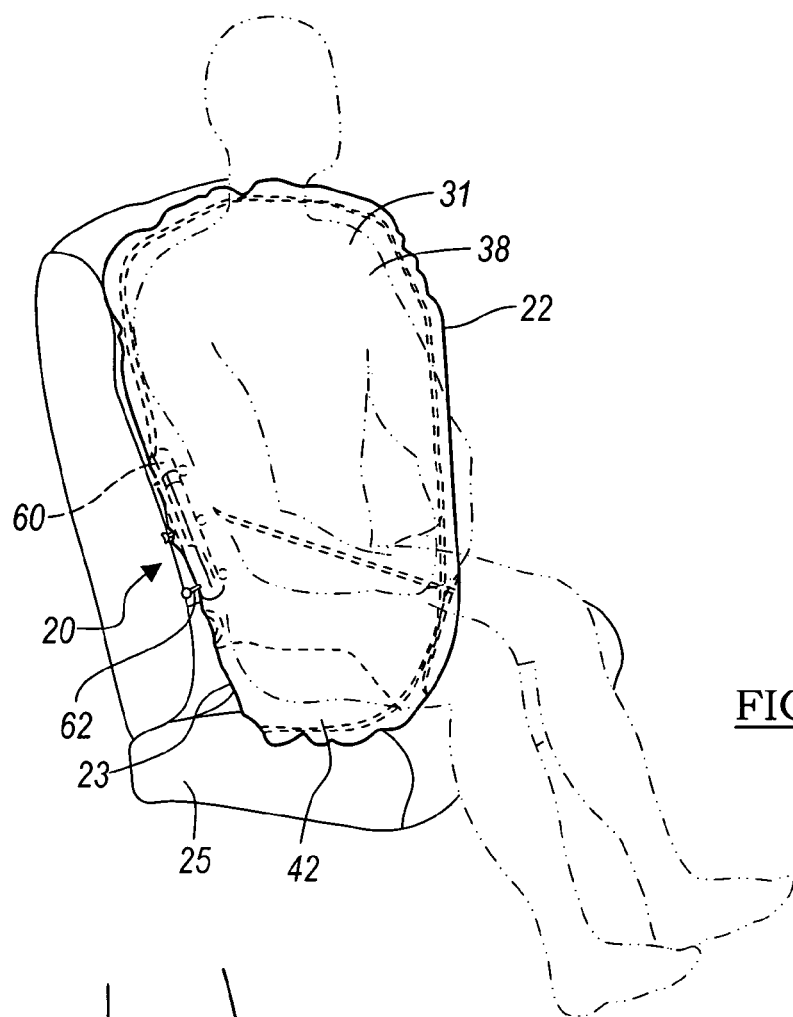
FIG. 3 is a perspective view of the cushion of FIG. 1 shown in vehicle position.

FIGS. 1 and 3 illustrate plan views of an inflated air bag with angled interior tether used in a side impact module generally shown as 20. The module 20 comprises an air bag 22 of sufficient length to extend generally the length of a seated occupant's torso seated in a vehicle. As illustrated, air bag 22 extends from the vehicle's seat 25 to the shoulder of the occupant 31. In other applications, the air bag 22 may extend above the shoulder so as to protect the occupant's head, for example. The air bag 22 is of sufficient height such that when deployed the air bag 22 will lie between the seat of the vehicle and the upper torso and/or shoulder of the outboard seated occupant (95th percentile male). When inflated, the air bag 22 will also lie against the vehicle's internal side.

Figure 2:
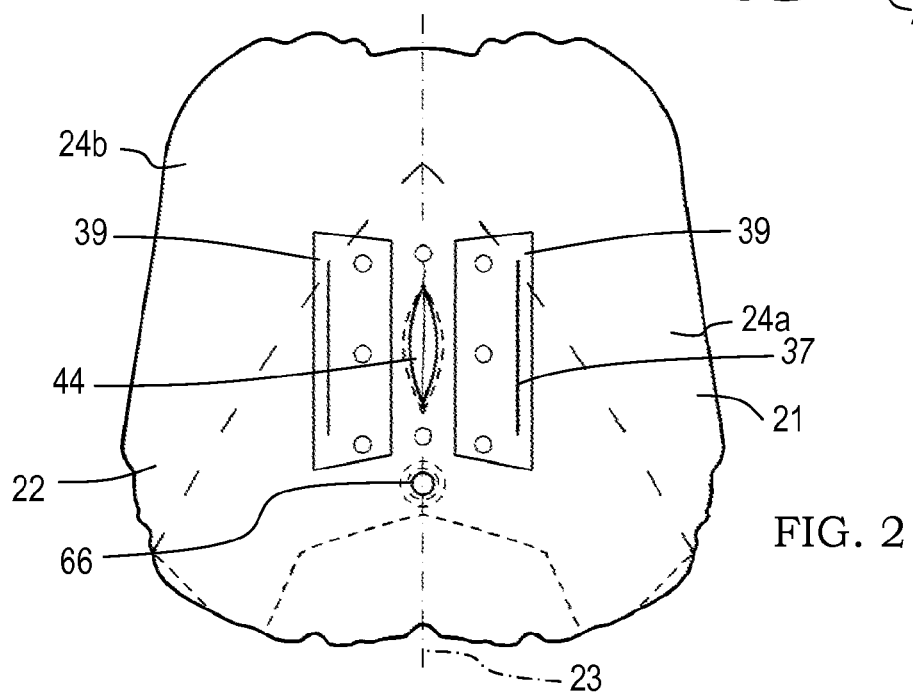
FIG. 2 is a plan view of the exterior of a cushion subassembly of the cushion shown in FIG. 1.

As seen in FIG. 2, the air bag 22 comprises a single main panel 21 that is folded about its centerline 23; the folded-over portions of the main panel 21 are referred to as a first or front 24a and a second or rear panel 24b. While for strength reasons it is preferred the main panel 21 be formed of a single piece of fabric, as can be appreciated, the air bag can be made of a plurality of separate panels of material joined together (along a centerline 23 or otherwise) as opposed to using a folded-over main panel 21. In the illustrated embodiment of the invention, the main panel 21 is a woven material such as nylon that is uncoated in a known manner to control air permeability. A low permeability, coated fabric may also be used.

With regard to the fabric, air bag material permeability and/or its coating are chosen to match the required time the air bag should be inflated. As will be seen from the discussion below, the air bag 22 is formed by sewing the remaining three sides or periphery (after it is folded over centerline 23) and interior panel of the air bag together to form an inflatable cushion 22 having multiple chambers. The side 26 of the air bag 22, as shown in FIG. 1, is formed using a seam 28, which joins panels 24a and b together. The sides of the panels are joined by one or more chain seams 28a and 28. Optionally, reinforcement stitching can be added at an area adjacent to the tether 30. Located on either side of the centerline 23 is a plurality of mounting features such as tabs 39, each tab 39 is coupled to a respective panel 24a and 24b shown in FIGS. 3 and 4.

The tabs 39 are used to reinforce the cushion and seal the insertion aperture 44. A plurality of fasteners from the inflator mount, not shown, are used to secure the air bag 22 at the centerline 23 to the seat The air bag includes an inlet in the form of an aperture 44 integrally formed between the panels 24a and 24b. In FIG. 1, the aperture 44 is located toward the bottom 42 of air bag 22 at the centerline 23, preferably adjacent to the internal tether 30. The internal tether 30 is positioned and angled to form an initial inflation lower chamber 36, which is preferably positioned below the abdomen of a $5^{th}$ percentile, seated, female occupant. The tether 30 also divides the air bag 22 into an upper chamber 38 (see FIG. 6b). as well as lower chamber 36.

An air bag inflator 60 is inserted in opening 44. The inflator 60 includes a mounting bracket 62 to permit the inflator 60 to be mounted to an adjacent structural component such as the seat frame or at a designated location along a seat back frame. The inflator 60 may be a solid propellant, hybrid, augmented or liquid inflator of known variety, which upon activation produces or supplies pressurized inflation gas to the air bag 22. The inflator 60 includes a plurality of radially oriented output ports 64 or a gas diverter housing (not shown) to direct the inflation gas into the air bag.

Reference is made to FIGS. 1 and 3. Shown is an internal tether 30, which is arranged relatively acute with respect to the vehicle seat cushion 25 or seat back angle. The internal tether 30 is coupled to panels 24a, 24b and about the centerline 23 at a generally acute angle A between 45 and 65 degrees, relative to the fold line of the cushion, which is directed downward toward the vehicle's floor. Upon initiation of the inflator 60, gasses flow, see arrow B, from the inflator's exit port(s) 64 along the length of the internal tether 30. Along the seam, at the far end of the tether, is an optional row of reinforcement stitches 28c.

FIG. 2 shows a subassembly which includes the main panel 21 of the air bag of FIG. 1, laid flat upon a work surface. The centerline 23 is also visible. The two sets of tabs 39 for each of the cushion portions are located adjacent the opening 44. As can be appreciated, one of benefits of using a relatively small insertion opening 44 is the ease of construction and ability to restrict gas leakage. Each tab 39 is laid on one of the air bag panels, such as 24a, and placed in the desired location, which is identified by pre-printed markers or lines. Each tab 39, at seam 37, is sewn along its side to the air bag panels 24a and 24b.

Figure 4:
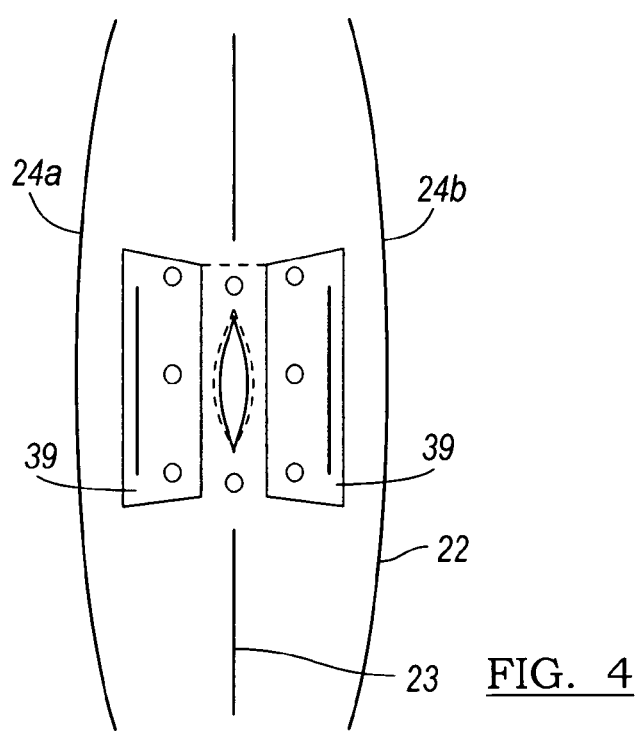
FIG. 4 is rear view of the inflator insertion portion of the cushion shown in FIG. 1.

The tabs 39 of FIG. 4 are configured to be wrapped around and secured about the inflator 60, which is held by the bracket or clamp 62. A hole 66 (see FIG. 2) is formed along the centerline 23 to accommodate lead wires to the squib or the electrical connection end of the inflator.

Figure 5:
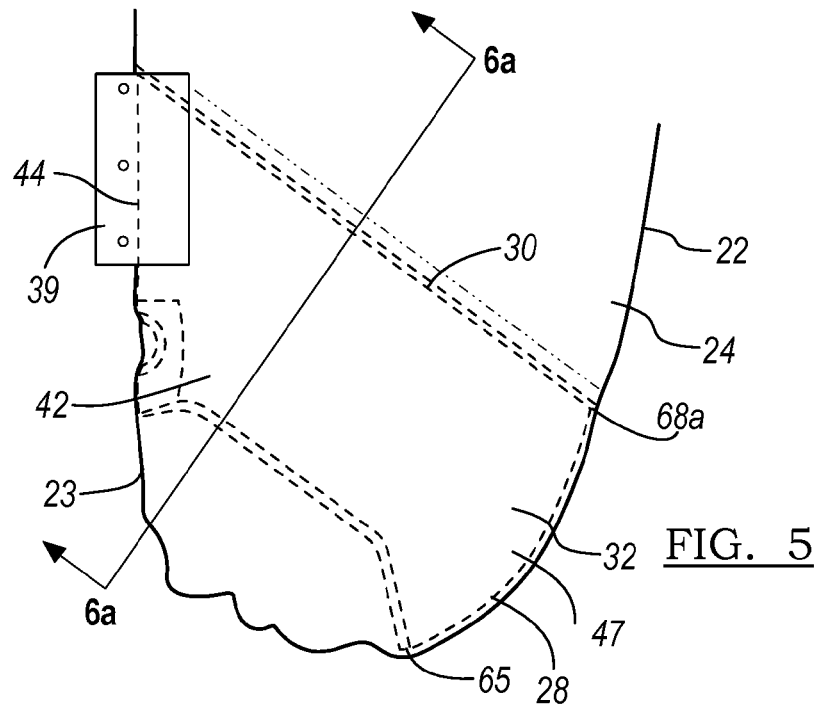
FIG. 5 illustrates a sectional view of the cushion shown in FIG. 1.
Figure 6A:
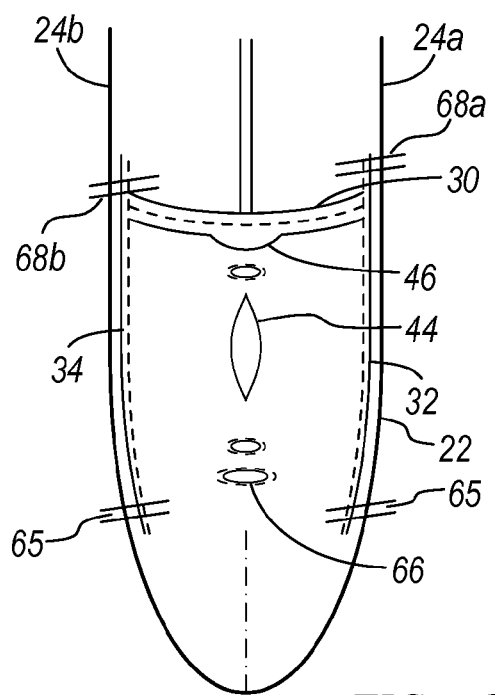
FIGS. 6a and 6b illustrate a cross-sectional view and plan view of the internal tether shown in FIG. 5.

As shown in FIGS. 5 and 6a, disposed adjacent to the internal tether 30 is a pair of heat shields 32 and 34 that extend from tether 30 to at least a portion of the sides of the lower chamber 36. The heat shields 32 and 34 preferably are formed of a single-sided silicon-coated material of a single panel sharing the fold line 23 of the main panel 24. The heat shields 32 and 34 extend along the sides of the cushion from the stitching 68a,b at the tether 30 to a lower set of stitching 65. Additionally, the heat shields 32 and 34 are coupled to each other at the seam of the lower chamber 36. The coupling of the two heat shield panels forms a pocket, which protects the obverse side 47 of the cushion from the discharging gasses.

The internal tether 30 can be of varying predetermined lengths depending upon the chosen angle A. Additionally, the cushion's width can be regulated by varying the width of the internal tether 30. The internal tether 30 has a pair of vents 46 and 48, which fluidly couple the first chamber 36 to the second chamber 38. The first vent 46 is formed by a semicircular cutout at a first end of the located internal tether 30. The semicircular cutout is located adjacent the centerline 23 of the air bag. The second vent 48 is a 1-inch diameter hole disposed generally centrally within the internal tether 30. At least a portion of the inflator 60 is disposed through the first vent 46 to at least partially restrict the flow of deployment gasses into the second chamber 38. Specifically, the inflator 60 reduces the available size of the passage formed by the first vent and the inflator body and obstructs the flow and therefore restricts the flow of gasses through the first vent 46 during the initial inflation of the cushion 22 while allowing an increased flow of gasses through the second vent 48 later in the deployment event. The internal tether 30 functions to regulate the width of the cushion 22 upon inflation while regulating the flow of compressed gasses from the lower (first) 36 to the upper (second) chamber 38.

The first chamber 36 of the air bag 22 is filled first with the inflation gas. Subsequently, chamber 38 fills to protect the upper torso. The size and placement of chambers 36 and 38 will vary with the particular vehicle and seating arrangement. By reducing the inflated volume of the first chamber 36, it is possible to use a smaller capacity inflator as less inflation gas is needed to inflate the air bag.

Disposed between these cushions is the internal tether 30 that joins together generally opposing regions of the front panel 24a and the rear panel 24b. Numeral 28a identifies the seams joining the internal tether to panel 24a, while numeral 28b identifies the sewn seams joining the heat shields to the side panels 24a and 24b.

Figure 6B:
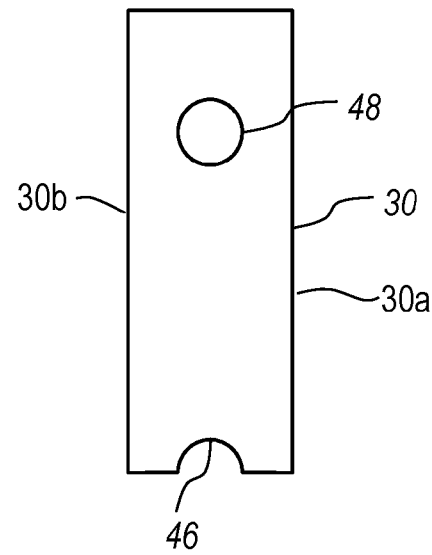

FIG. 6a is a cross-sectional view of the cushion 22 having an internal tether 30. As can be seen, this internal tether 30 includes the sides which are sewn to a corresponding air bag panel 24a or 24b. The internal tether 30 includes previously mentioned vents. As can be appreciated, when the air bag 22 is inflated, the various panels 24a and 24b will tend to be forcefully pulled apart and resist further inflation of the cushions. The interior tether 30 and the main panel are made of woven material arranged at a bias (45°±5°) to the air bag panels 24a,b. The sew line coupling one side of the internal tether to one side panel is generally in alignment with the sew line of the other side of the internal tether in the second panel. FIG. 6b is a plan view of the internal tether 30 shown in FIG. 6a.

Figure 7:
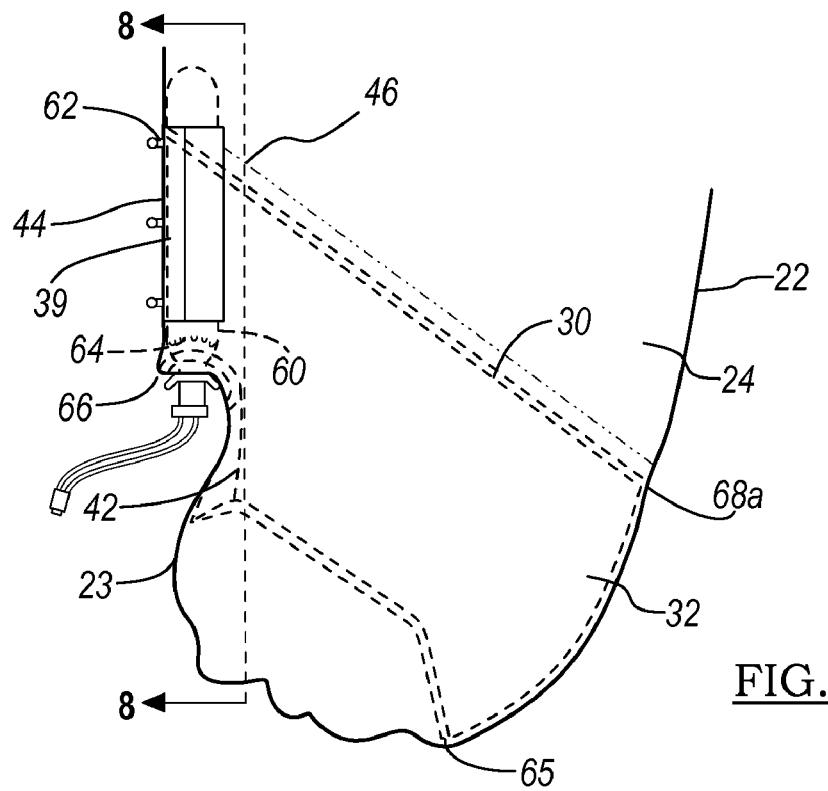
FIG. 7 illustrates the cushion shown in FIG. 4 with an inflator inserted.

Reference is again made to FIG. 7. As can be seen, the tabs 39 are wrapped about mounting bracket 62 of the inflator 60. The inflator 60 is shown partially disposed within both the first and second chambers. In this regard, the inflator 60 is disposed through the first vent 46. Although wires are shown disposed through the aperture 66 formed along the centerline, it is envisioned that a portion of the inflator 60 can be positioned through the aperture to allow for easy electrical connection with the inflator as shown in FIG. 8b.

Figure 8A:
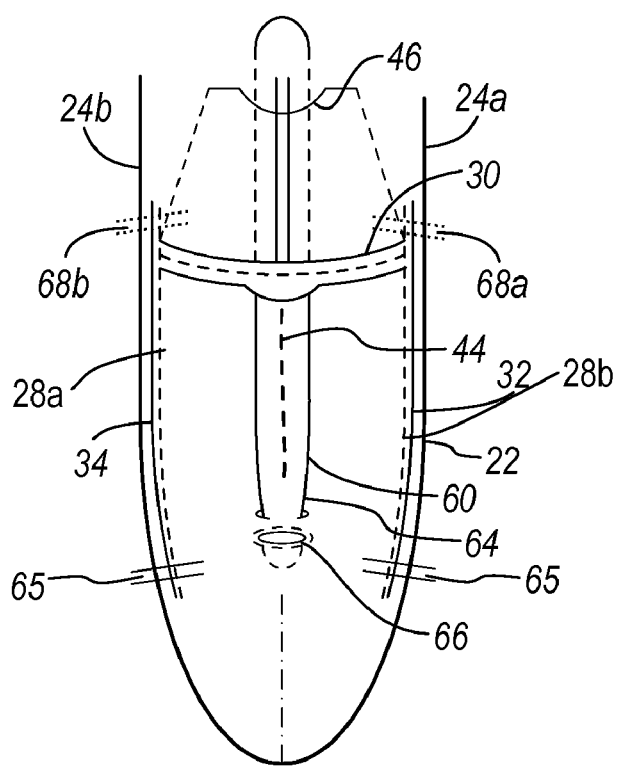
FIGS. 8a and 8b represent the cushion shown in FIG. 6 with an inserted inflator.
Figure 8B:
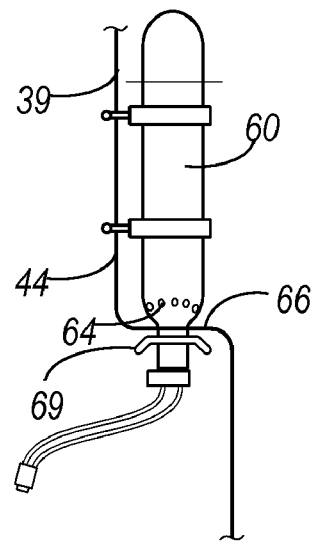

FIG. 8a is a cross-sectional view of the cushion 22 having an exemplary internal tether 30. As can be seen, this internal tether 30 includes the first vent 46 with the inflator disposed therethrough. As can be appreciated, when the air bag 22 is inflated, the various panels 24a and 24b will tend to be forcefully pulled apart and resist further inflation of the cushions. The output ports 64 of the inflator 60 are positioned so that the inflation gasses impinge on the heat shields as the cushion is filled. FIG. 8b shows a side cross-sectional view of the cushion with inserted inflator 60. The inflator 60 is partially positioned through the hole 66 formed along the centerline 23 of the main panel 21. As shown, the inflator 60 is coupled to the cushion using a snap ring 69.

The cushion is formed by sewing the internal tether and one heat shield to the cushion main panel. Upon sewing the internal tether to panel 24b of air bag 22, panel 24a is positioned on top of panel 24b and the internal tether 30 and second heat shield 34 are then joined to panel 24b. With the panels 24a and 24b in this orientation, the top and sides of the air bag are secured together along peripheral seams 28c, 28a and 28b.

Subsequently, the air bag is folded into a long, compact, cylindrical configuration. An additional benefit of the internal tether 30 is that the various folds in the air bag 22 can be arranged such that the various seams of each internal tether 30 do not lie on top of each other, thereby permitting the air bag 22 to be folded in a compact configuration. To keep the air bag 22 in this rolled configuration, the air bag 22 is enveloped in a tearable cover such as sewn fabric, polyurethane with tear seam or snap-together (and openable) semi-hard plastic cover. The folded, enveloped air bag is then secured to the vehicle seat using a plurality of fasteners.

Many changes and modifications in the above-described embodiment of the invention can, of course, be carried out without departing from the scope thereof. Accordingly, that scope is intended to be limited only by the scope of the appended claims. While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A side impact restraint system (20) for restraining an occupant comprising:
   an air bag of sufficient length to extend from a seat surface to at least a shoulder of the occupant, the air bag (22), upon inflation, of sufficient height to extend from a vehicle to a location generally adjacent the shoulder of the occupant when seated such that the inflated air bag will lie between the occupant and a side portion of the vehicle;
   the air bag (22) including a main panel having a center fold line and a first panel part and a second panel part (24a, 24b) lying on either side of the fold line, the main panel including an insertion aperture (44) generally symmetrically aligned with the center fold line and configured to receive an inflator at a mounting region proximate an interior of the air bag generally along the center fold line of the air bag; and
   an internal tether (30) for forming at least one bridge between predetermined regions of each of the first panel part and second panel part such that upon inflation of the air bag these regions are spaced from one another by the internal tether to create a pair of inflatable volumes (36, 38), said internal tether being coupled to portions of the air bag to form an acute angled surface with respect to an intersection of the first panel part and second panel part, the tether extending downwardly in a generally planar manner, from the location of the mounting region for the inflator.

2. The system as defined in claim 1 wherein the internal tether defines an opening (46) in an end thereof, the end oriented toward the mounting region for the inflator in the air bag.

3. The system as defined in claim 2 further comprising an inflator (60) abutting the opening and extending above and below the end of the tether, the inflator adjacent to and parallel to the center fold line.

4. The system as defined in claim 1 wherein opposing edges of the bridge are secured to a corresponding first panel part and second panel part along a corresponding sewn seam.

5. The system as defined in claim 4 wherein the sewn seam of one edge of the bridge in the first panel part is generally in alignment with the sewn seam of the other edge of the bridge in the second panel part.

6. The system as defined in claim 1 wherein the tether is straight.

7. The system according to claim 1 including first and second tabs, initially separate from both the first and second panel part, each tab secured to a respective first and second panel part and located on an opposing side of and adjacent to the insertion aperture, each tab configured to enclose the insertion aperture after the inflator is in the air bag.

8. A side impact restraint system (20) comprising:
   an air bag of sufficient length to extend from a seat surface to at least a shoulder of an occupant, the air bag (22), upon inflation, of sufficient height to extend from a vehicle seat cushion to a location generally adjacent the shoulder of the occupant when seated such that the inflated air bag will lie between the occupant and a side portion of the vehicle;
   the air bag (22) formed of a single panel folded along a centerline (23) to form first and second panels (24a, 24b) of material that are joined together to create a pair of inflatable volumes (36,38), the panel configured to define an insertion aperture generally along the centerline, to receive an inflator and an exit aperture through which a portion of the inflator may extend, the exit aperture spaced from the insertion aperture, the insertion aperture generally cutting through the centerline, and an internal tether (30) disposed at an acute angle between 45 and 65 degrees between each volume, for forming at least one bridge between predetermined regions of each of the first and second panel such that upon inflation of the air bag these regions are spaced from one another by the tether, the first inflatable volume being placed below the ribs of the occupant, the tether extending downwardly generally from an area of the insertion aperture toward an opposing portion of the air bag.

9. The system (20) according to claim 8 wherein the internal tether defines an opening (46) in an end thereof, the end oriented toward the insertion aperture, wherein with an inflator in the insertion aperture a portion of the inflator is adjacent the opening.

10. The system (20) according to claim 8 wherein the internal tether includes opposing long sides and opposing ends, and wherein the tether is secured to a corresponding first and second panel along a respective side of the tether.

11. The system of claim 8 wherein the insertion aperture cuts through the centerline.

12. The system according to claim 8 including first and second tabs, initially separate from both the first and second panel parts, each tab secured to a respective one of the first panel part and second panel part and located on an opposing side of and adjacent to the insertion aperture, each tab configured to enclose the insertion aperture after the inflator is in the air bag.

13. A side impact restraint system for restraining an occupant comprising:
   an air bag of sufficient length to extend from a seat surface to at least a shoulder of the occupant, the air bag, upon inflation, of sufficient height to extend from a vehicle to a location generally adjacent the shoulder of the occupant when seated such that the inflated air bag will lie between the occupant and a side portion of the vehicle;

the air bag including a main panel having a center fold line and a first panel part and a second panel part lying on either side of the fold line, the main panel including an insertion aperture that generally cuts through the center fold line configured to receive an inflator at a mounting region proximate an interior of the air bag generally along the center fold line of the air bag; and an internal tether for forming at least one bridge between predetermined regions of each of a first panel part and second panel part such that upon inflation of the air bag these regions are spaced from one another by the internal tether to create a pair of inflatable volumes.

14. The system according to claim 13 including first and second tabs, initially separate from both the first and second panel part, each tab secured to a respective first and second panel part and located on an opposing side of and adjacent to the insertion aperture, each tab configured to enclose the insertion aperture after the inflator is in the air bag.

15. The system according to claim 14 wherein each first and second tab includes a like number of openings through which an inflator bracket part extends.

16. The system according to claim 15 wherein the first tab is sewn along a respective side thereof to the first panel part and wherein the second tab is sewn along a respective side thereon to the second panel part.

17. The system according to claim 13 wherein the internal tether (30) is positioned below the abdomen of an adult occupant.

18. The system as defined in claim 17 wherein the internal tether defines an opening (48) therein to allow inflation gas to flow thereacross.

19. The system as defined in claim 18 further comprising the inflator (60) partially disposed within the opening.

* * * * *